No. 880,422. PATENTED FEB. 25, 1908.
A. O. TATE.
STORAGE BATTERY PLATE.
APPLICATION FILED JULY 3, 1907.
2 SHEETS—SHEET 1.
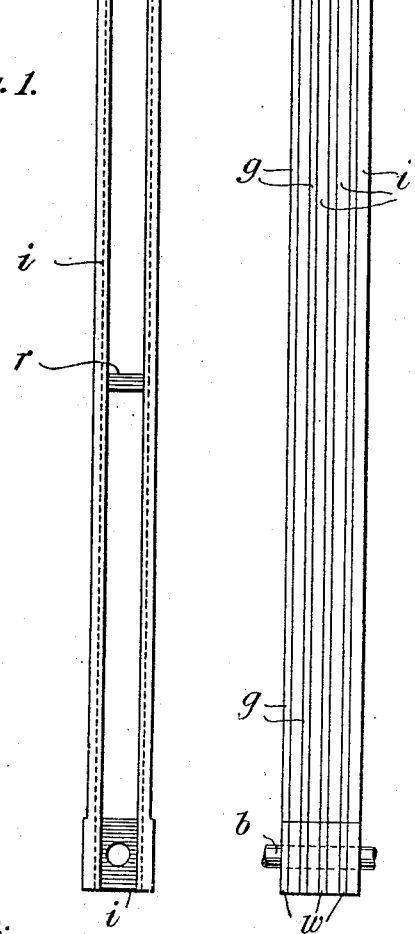
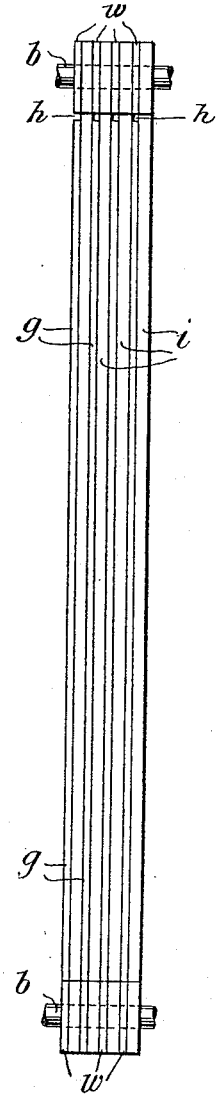
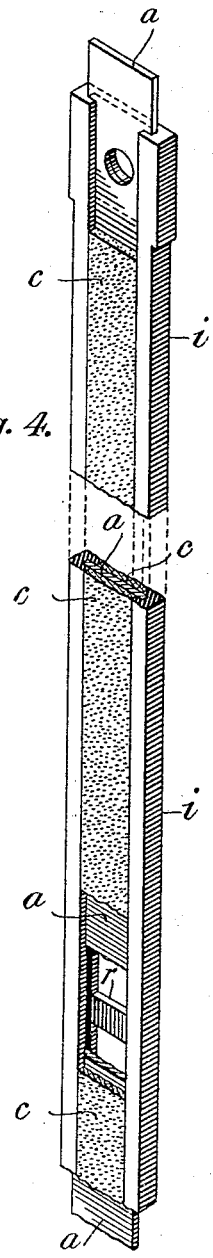
WITNESSES:
C. E. Ashley
M. F. Keating
INVENTOR
Alfred O. Tate
By his Attorney,
Charles J. Kintner No. 880,422. PATENTED FEB. 25, 1908.
A. O. TATE.
STORAGE BATTERY PLATE.
APPLICATION FILED JULY 3, 1907.
2 SHEETS—SHEET 2.
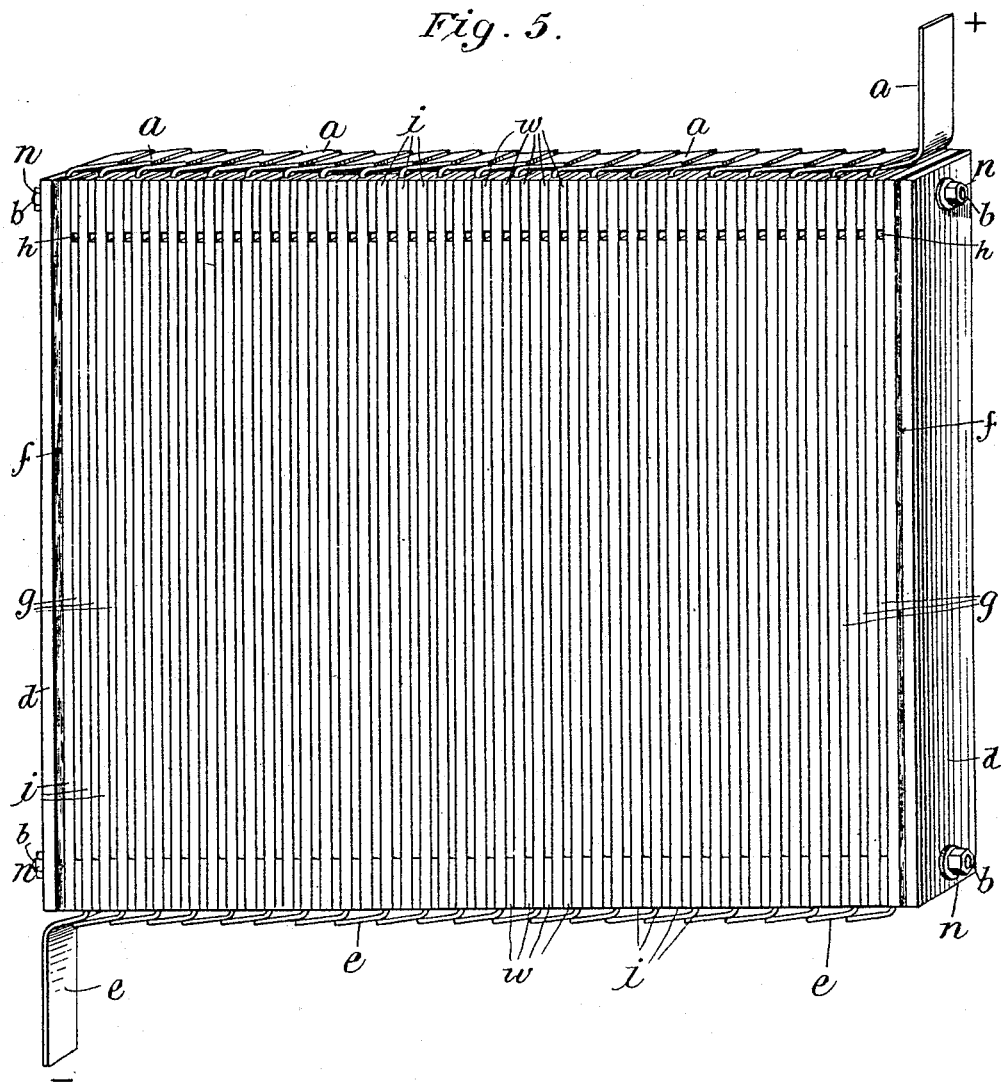

UNITED STATES PATENT OFFICE.

ALFRED O. TATE, OF TORONTO, ONTARIO, CANADA, ASSIGNOR TO TATE ELECTROLYTIC COMPANY OF AMERICA, A CORPORATION OF NEW YORK.

STORAGE-BATTERY PLATE.

No. 880,422.   Specification of Letters Patent.   Patented Feb. 25, 1908.

Application filed July 3, 1907. Serial No. 382,119.

*To all whom it may concern:*

Be it known that I, ALFRED O. TATE, a subject of the King of Great Britain, residing in Toronto, Ontario, Dominion of Canada, have made a new and useful Invention in Storage-Battery Plates, of which the following is a specification.

My invention is directed to storage battery plates of the applied oxid type and particularly to an improvement upon a plate of bifunctional nature disclosed in a prior application filed by me in the U. S. Patent Office on the 1st day of December, 1905, bearing Serial No. 289,796, and it has for its objects—First, to provide more reliable or perfect means for supporting the thin strips or ribbons of which the plate is composed and of protecting them from electrolytic action. Second, to construct a bifunctional storage battery plate of the type indicated which shall be of greater mechanical strength, lighter, and of equal flexibility to the plate disclosed in the before-mentioned application. Third, to provide more efficient and more economical means for assembling the parts of which such a plate is composed.

For a full and clear understanding of my invention such as will enable others skilled in the art to construct and use the same reference is had to the accompanying drawings which illustrate the details of the entire structure.

Figure 1 is a side elevational view of one of the supporting and insulating frames for each anode or cathode strip; Fig. 2 is an end view thereof as seen looking at Fig. 1 from the top toward the bottom of the drawings; Fig. 3 is a front elevational view of a portion of a completed plate with the parts assembled; Fig. 4 is an enlarged perspective view broken at the upper and lower portions thereof and broken away at the middle portion thereof to show the entire structure of one of the complete anotdes or cathodes as assembled ready for the formation of the completed plate. Fig. 5 is a perspective view of a completed plate of the bifunctional type.

In the bifunctional plate disclosed in my prior application the individual anodes and cathodes consisted of thin strips or ribbons of antimonious lead which were flanged at their lateral edges in such manner as to support on the opposite faces thereof thin films of oxid of lead or equivalent active material and these anodes and cathodes were interleaved and connected in multiple respectively at their upper and lower ends to conducting bars or rods which constitute the poles of the plate, the strips of porous insulating media being interleaved between the respective sets of anodes and cathodes.

The present invention is intended to comprehend a more perfect manner of assembling the several parts of such a bifunctional plate for the purpose of making it more commercially perfect, capable of withstanding harder usage and possessing the additional advantage of such a structural arrangement of parts as to facilitate the assemblage thereof in the manufacture of the complete plate.

The improvement contemplates further the utilization of a minimum amount of metal for the conducting strips or ribbons of the anodes and cathodes, for that in the plate disclosed in the before-mentioned application such strips or ribbons were provided with lateral flanges as before stated which act as pockets or grooves for sustaining the active material and added, therefore, material weight to the entire structure. Whereas, in the present improvement these metallic flanges are done away with and the strips or ribbons are constructed of as little metal as is practicable and are supported in a much more reliable and mechanically efficient manner, and by a structure that eliminates a very appreciable amount of weight and materially reduces any possibility of chemical action of the electrolyte upon the conducting strips or ribbons, said strips or ribbons being wholly inclosed at their lateral edges in insulating material. Although these strips or ribbons may be made of any good conductor which will answer the purpose, such as antimonious lead, as disclosed in my before-mentioned application, I may make them of any good conducting material, preferably steel electro-plated with lead.

Referring now to the drawings in detail in which all letters of reference represent like or equivalent parts wherever used, *i* represents an open supporting and insulating frame for any one of the strip or ribbon like anodes or cathodes, this frame being composed preferably of hard rubber, vegetable fiber or any equivalent insulating medium of sufficient strength and flexibility to answer the purpose. I prefer to use hard rubber and in the construction of these frames they are stamped out bodily from a sheet of the material in such manner as to give the conformation shown in Fig. 1 of the drawings with enlarged squared ends and holes or openings therethrough and a central rib $r$. After being thus stamped out one face of each end is milled out to the same width as the slot like openings between said ends and the rib $r$, and said rib is also milled out, the portions milled out representing a depth say of $\frac{2}{32}$ of an inch in each instance, the entire thickness of the supporting and insulating frame being $\frac{3}{32}$ of an inch; the length thereof 8 inches; the width $\frac{1}{2}$ an inch and the width of the openings between the ends and the rib $r$ being $\frac{5}{16}$ of an inch. These proportions are of sufficient size for the parts of a full sized plate, but may be varied, if desired. After the milling is effected I pass a rotary grooving tool through the slotted openings in the direction of the length of the frame so as to cut out grooves in the inner faces thereof, as shown in dotted lines Fig. 1 and as shown in end view Fig. 2; these grooves constituting the points of support for the strips or ribbons, as will now be described, reference being had to Fig. 4 of the drawings.

$a$ represents one of such strips or ribbons which is of such width as to fit snugly when drawn into the grooves just described, and in this connection I may state that I prefer to place in said grooves, before the strip is drawn in to its extreme limit, a liquid insulating and sealing medium, such as liquid asphalt or any insulating liquid which will effectually seal and secure the edges of the strip to the inner surfaces of the grooves and thus protect it more effectually from the attacks of the electrolyte. When this ribbon is drawn in to the full extent one face thereof rests flat against the milled surfaces at the opposite ends of the frame and of the intermediate rib $r$ and these surfaces may also be coated with the before mentioned insulating liquid medium, all in such a way that when put together in the manner described there is formed a frame and ribbon support of remarkable flexibility, strength and durability. When the strips are thus drawn in to their complete limit holes are provided in each end which correspond to the holes in the ends of the supporting frame, and after the strips are secured in the manner described the active material $c$ is applied in the nature of very thin coatings or films on both sides of the strip $a$, as shown; the coating represented in Fig. 4 of the drawings being very much exaggerated; said coating, however, being flush with the faces of both sides of the frame $i$.

Referring now to Fig. 3 of the drawings I will describe the manner of assembling the parts of the entire plate. $i, i$ represents as before the supporting and insulating frame and $g, g$, a series of intermediate interleaved porous strips preferably of kaolin and of the same width as the frames $i, i$, the thickness of said strips being preferably $\frac{1}{16}$ of an inch. $w, w$, represent square shaped insulating washers for spacing the anodes and cathodes, said washers being of the same rectangular dimensions as the squared ends of the supporting frames $i, i$. $b, b$, are insulating supporting rods adapted to be passed through the openings at the opposite ends of the supporting frames $i, i$, and anode and cathode strips or ribbons $a, a$.

It will be noted on examination of Fig. 4 that the upper end of one of the anode or cathode strips $a$, as shown, extends above the upper end of the supporting frame, so that when the several parts are assembled all of those conducting ribbons or strips which constitute the anodes at the upper end of the plate are bent over so as to come into good electrical contact with each other and are then lead brazed together, the several strips when thus brazed together constituting the anode poles $a, a$, of the plate and in like manner the corresponding intervening strips which constitute the cathodes have their lower ends projecting, and are bent over and brazed together so as to constitute the cathode poles $e, e$, of the plate. (See Fig. 5). After being assembled on the insulating supporting rods $b, b$ which also support flexible cushion strips $f, f$, of rubber, and binding plates $d, d$, at their opposite ends in the same manner, as disclosed in the before-mentioned application they are firmly secured by nuts $n, n, n, n$ so as to thereby constitute in effect one integral bifunctional plate in which the admission of the electrolyte to the active material $c$ is always through the lateral edges of the insulating porous strips $g, g$, and in this connection I may state that for the purpose of affording more free admission of the electrolytic solution I prefer to knurl in a direction cross-wise of their length the side faces of the supporting and insulating frame $i, i$ against which the porous strips $g, g$, rest. The lower ends of the porous strips $g, g$, rest upon the lower squared washers $w, w$, and said strips are of such length that their upper ends are separated in each instance from the lower edges of the upper squared washers $w, w$, to a sufficient extent to leave vents or openings $h, h$, so as to thereby afford free egress for the gases generated between the faces of the anode and cathode plates in a manner which will be readily understood by those versed in the art.

I do not limit my improvement to the specific details of construction illustrated in the accompanying drawings and hereinbefore described, as I believe it is broadly new with me to support narrow strips or ribbons in alternate relation to each other by insulating frames in such manner that said strips are protected from the action of the electrolyte and that the action of said electrolyte upon the active material shall be wholly through porous insulating media located between said frames. In other words, I believe it is broadly new with me to provide an insulating and supporting frame for the individual elements constituting the anodes and cathodes of a bifunctional plate and in such manner that the action of the electrolyte cannot appreciably attack such anodes and cathodes.

Having thus described my invention what I claim and desire to secure by Letters Patent of the United States is—

1. A bifunctional storage battery plate, embracing conducting strip or ribbon like anodes and cathodes, each one of which is held or supported by an open insulating frame, substantially as described.

2. A bifunctional storage battery plate, embracing conducting anodes and cathodes of strip or ribbon like form, each supported or sustained by an open insulating frame; in combination with interleaved strips of insulating material, substantially as described.

3. A bifunctional storage battery plate, embracing strip or ribbon like conducting anodes and cathodes, each supported or sustained by an open insulating frame; in combination with interleaved strips of porous insulating material, substantially as described.

4. A bifunctional storage battery plate composed of interleaved strip or ribbon like anodes and cathodes sustained at their lateral edges by insulating frames, substantially as described.

5. A bifunctional storage battery plate composed of interleaved strip or ribbon like anodes and cathodes sustained at their lateral edges by insulating frames and coated on their opposite faces with active material, substantially as described.

6. A bifunctional storage battery plate composed of interleaved strip or ribbon like anodes and cathodes each sustained by an open insulating frame and coated each on both sides with active material, substantially as described.

7. A bifunctional storage battery plate composed of interleaved strip or ribbon like anodes and cathodes each sustained by an open insulating frame and coated each on both sides with active material; in combination with interleaved insulating material, substantially as described.

8. A bifunctional storage battery plate composed of interleaved strip or ribbon like anodes and cathodes each sustained by an open insulating frame and coated with active material; in combination with interleaved strips of porous insulating material and means for binding all of said parts together in one complete plate, substantially as described.

9. A bifunctional storage battery plate, embracing a series of strip or ribbon like anodes connected together at one end of the plate and a series of strip or ribbon like cathodes similarly connected at the other end thereof; said strips being each sustained by an open insulating frame and separated from each other by similar strips of porous insulating material and all held together by binding means, substantially as described.

10. Means for sustaining each of the conducting elements of a storage battery, embracing an internally grooved insulating frame provided with central and end supports having their supporting faces located in the plane of the grooves, substantially as described.

11. A frame or support for a ribbon or strip like conductor adapted for use in a storage battery, constructed of insulating material having a slot-like opening, and internal grooves in the lateral faces of said opening, substantially as described.

12. A bifunctional storage battery plate, embracing conducting anodes and cathodes of strip or ribbon like form coated with active material and each supported by an insulating frame; in combination with interleaved strips of insulating material, all of the ends of the anodes being connected together to constitute the anode pole of the plate and all of the ends of the cathodes likewise connected together to constitute the cathode pole thereof; together with rods, end-plates and means for securing all of said parts together in one flexible structure, substantially as described.

In testimony whereof I have signed my name to this specification in the presence of two subscribing witnesses.

ALFRED O. TATE.

Witnesses:
 M. TURNER,
 M. F. KEATING.